No. 761,827. PATENTED JUNE 7, 1904.
H. GOERSS.
STEERING WHEEL FOR AUTOMOBILES.
APPLICATION FILED SEPT. 24, 1903.
NO MODEL.
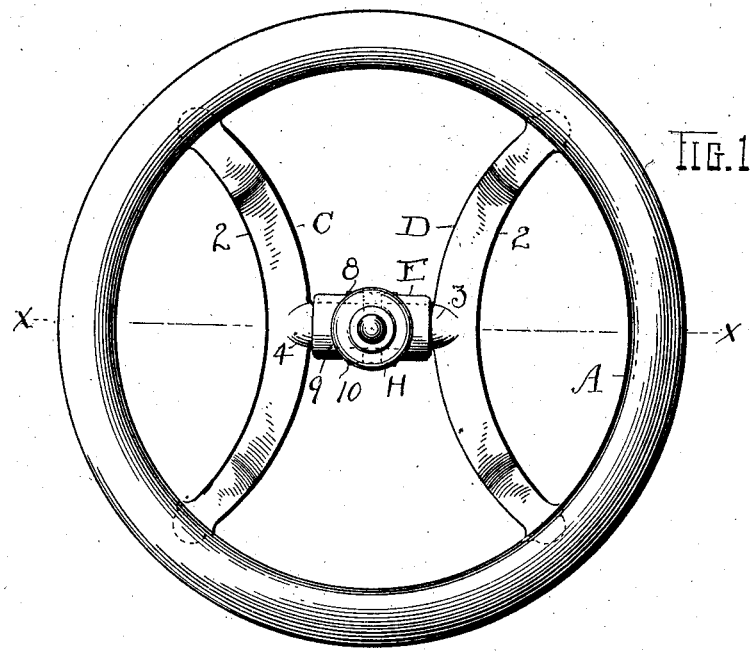
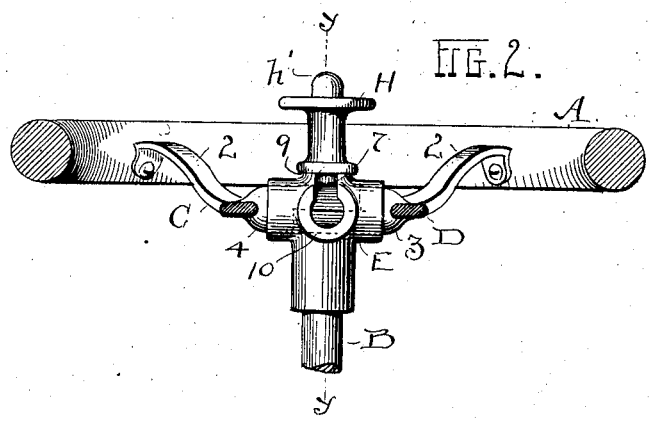
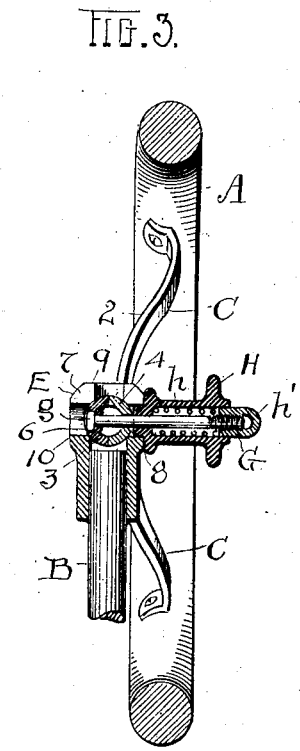
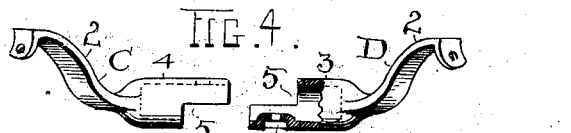
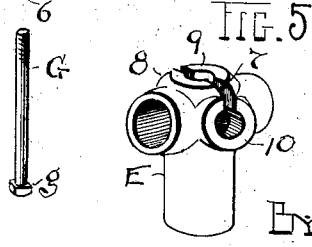
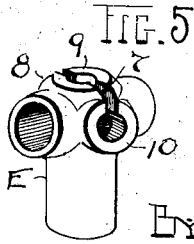
ATTEST.
R. B. Moser
a. u. Moser.
INVENTOR.
Herman Goerss
By H. J. Fisher
ATTY No. 761,827. Patented June 7, 1904.

UNITED STATES PATENT OFFICE.

HERMAN GOERSS, OF CLEVELAND, OHIO.

STEERING-WHEEL FOR AUTOMOBILES.

SPECIFICATION forming part of Letters Patent No. 761,827, dated June 7, 1904.

Application filed September 24, 1903. Serial No. 174,524. (No model.)

*To all whom it may concern:*

Be it known that I, HERMAN GOERSS, a citizen of the United States, residing at Cleveland, in the county of Cuyahoga and State of Ohio, have invented certain new and useful Improvements in Steering-Wheels for Automobiles; and I do declare that the following is a full, clear, and exact description of the invention, which will enable others skilled in the art to which it appertains to make and use the same.

My invention relates to a steering-wheel for automobiles; and the invention consists in a steering-wheel which is constructed in parts and is adjustable from a horizontal to a vertical position on either side of the post carrying the same, substantially as shown and described, and particularly pointed out in the claims.

In the accompanying drawings, Figure 1 is a plan view of my invention; and Fig. 2 is an elevation thereof with the handle portion in cross-section and taken substantially on line $x$ $x$, Fig. 1. Fig. 3 is a sectional elevation on a line corresponding to $y$ $y$, Fig. 2, but with the handle in a vertical instead of a horizontal position. Fig. 4 shows the two metallic members of the handle in edge elevation, corresponding in position to the position seen in Fig. 2, and separated. Fig. 5 is a perspective view of the handle-supporting head in detail, and Fig. 6 is a detail of the engaging bolt.

The invention as thus shown and described constitutes a steering-wheel mechanism for automobiles with a special adaptation for the rotation of handle A to either side of the post or standard B as convenience may require, as well as the fixing of the handle in a horizontal or working position, as seen in Figs. 1 and 2. The said handle is comprised of the circular portion A, which is preferably of wood, though it may be of other suitable material, and the two metallic sections C and D, which in a very true sense are alike, though not exactly duplicates, and which are each provided with a pair of horns 2 and a tubular section or portion 3 and 4, respectively, at their middle portions extending inwardly. These tubular sections are cut or sectioned away about half their depth and length to form recesses 5, and these recessed portions are overlapped, so that in use they come together and constitute practically one piece or part when confined with the tubular head E. The engaging bolt G is passed through the recessed portions of the said tubular sections, and the section 3 has a counter-recess 6 about the hole for the said bolt, in which the angular head $g$ of the bolt is adapted to rest and to be locked against rotation. The tubular head E, which carries the handle, is sleeved upon and secured to the rotatable post or standard B, through which the steering mechanism for the vehicle is reached, as usual. The said head E has a slot 7 centrally thereof and bisecting the head from side to side half-way around over its top, and in the path of this slot a quarter-turn apart are three several bosses 8, 9, and 10, respectively. These bosses or openings are adapted to be engaged by the locking-bolt H, as seen in Fig. 3. This bolt is substantially barrel-shaped and is supported on engaging or supporting bolt G, which extends outwardly a sufficient distance from head E to receive the locking-bolt H on its exposed portion and affords a sliding longitudinal movement thereon to make engagement and disengagement of the said bolt H with the bosses in head E. To this end also bolt H carries a retaining-spring $h$ internally about bolt E, and a nut $h'$ confines said spring, but permits bolt H to slide over it more or less, when withdrawn for disengagement with the bosses. Said bolt H also preferably has a head to enable it to be conveniently gripped by hand when adjustment of the parts is required. Thus a simple and comparatively inexpensive and convenient wheel is produced and one which is easily assembled and separated; but when assembled it is perfectly rigid and may be used in horizontal or vertical position.

It will be observed that in this wheel it is possible to turn it to either side of its center. Hitherto, so far as I am aware of and believe, there is no wheel made having this capability, because wheels have been hinged to swing to one side only; but my wheel swings to either side instead of being hinged. It is formed in separate supporting sections or parts, which enable me to pivot the wheel in the head, and thus secure not only a perfectly rigid wheel, as such, but one which affords the free swing to either side, and this materially improves the value of the wheel, besides making it much stronger and a more durable structure than heretofore in wheels of this general kind.

What I claim is—

1. In a steering-wheel, a handle comprising a rim and two separate supporting members having tubular sections constructed to overlap and match, substantially as described.

2. In a steering-wheel for automobiles and like purposes, a handle comprising two separate members having tubular sections at their middle overlapping each other and a circular handle to which said separate members are secured at their ends, substantially as described.

3. A steering-wheel comprising two metallic sections having recessed tubular extensions adapted to overlap at said recesses and having arms, and a rim engaged with said arms; in combination with a tubular head upon which said tubular extensions are adapted to be locked, substantially as described.

4. In a steering-wheel mechanism for automobiles, a tubular head and a steering-wheel comprising separate supporting-sections provided each with a tubular recessed portion engaged with the corresponding portion of the other section, and means to lock the wheel upon said head in both vertical and horizontal positions, substantially as described.

5. The steering-wheel substantially as described, in combination with a tubular head having a slot in the arc of a circle and a plurality of bosses intersecting said slot at right angles to each other, and means to engage said bosses and lock the wheel in one position or another, substantially as set forth.

6. In steering-wheel mechanism, a tubular head having a slot bisecting the same transversely across its top, and a series of bosses intersecting said slot at right angles to each other, in combination with the wheel engaged in said head, and a locking-bolt and mechanism connected with said wheel and adapted to travel in said slot from side to side and to engage said bosses, substantially as set forth.

In testimony whereof I sign this specification in the presence of two witnesses.

HERMAN GOERSS.

Witnesses:
R. B. MOSER,
H. T. FISHER.